United States Patent
Rousseau

(10) Patent No.: US 6,341,821 B1
(45) Date of Patent: Jan. 29, 2002

(54) ERGONOMIC ARMREST AND JOYSTICK ASSEMBLY

(76) Inventor: Vincent Rousseau, 83, de la Fabrique, Dolbeau, (Quebec) (CA), G8L 3H1

( * ) Notice: Subject to any disclaimer, the term of this patent is extended or adjusted under 35 U.S.C. 154(b) by 0 days.

(21) Appl. No.: 09/497,702

(22) Filed: Feb. 4, 2000

(51) Int. Cl.⁷ .................................................. B60N 2/46
(52) U.S. Cl. ........................... 297/411.36; 297/188.14; 297/411.38; 297/411.44
(58) Field of Search ........................ 297/411.32, 411.33, 297/411.34, 411.35, 411.36, 411.38, 411.44, 188.14

(56) References Cited

U.S. PATENT DOCUMENTS

| | | | | |
|---|---|---|---|---|
| 1,721,221 A | * | 7/1929 | Jauregui ................. | 297/411.35 |
| 3,011,739 A | | 12/1961 | Boyce et al. | |
| 4,592,526 A | | 6/1986 | Kobelt | |
| 4,702,520 A | * | 10/1987 | Whisler et al. ........ | 297/411.36 |
| 4,887,866 A | * | 12/1989 | Rusin ..................... | 297/411.44 |
| 5,029,941 A | | 7/1991 | Twisselmann .......... | 297/411.38 |
| 5,143,422 A | * | 9/1992 | Althofer et al. ........ | 297/411.36 |
| 5,288,130 A | * | 2/1994 | Foster .................... | 297/411.36 |
| 5,326,063 A | | 7/1994 | Stevens | |
| 5,379,663 A | | 1/1995 | Hara | |
| 5,476,304 A | | 12/1995 | Gulliver et al. | |
| 5,571,274 A | * | 11/1996 | Holstensson ........... | 297/411.36 |
| 5,653,499 A | | 8/1997 | Goodall | |
| 5,655,814 A | | 8/1997 | Gibbs | |

FOREIGN PATENT DOCUMENTS

| | | | | |
|---|---|---|---|---|
| GB | 2068719 | * | 8/1981 | ............ 297/411.44 |

* cited by examiner

Primary Examiner—Peter R. Brown
(74) Attorney, Agent, or Firm—François Martineau

(57) ABSTRACT

This assembly is an armrest and a joystick support for use by a heavy machinery operator. The assembly includes a bracket secured to the backrest, on the side and above the operator'seat, a straight bar extending forwardly from the bracket, a first connector assembly including a universal joint for connecting the rear end of said bar of the bracket and a joystick support connected to the front end of the bar through a second connector assembly including a universal joint. The armrest is supported above the intermediate portion of the bar through a third connector assembly including a sleeve and a pair of upright elongated plates with longitudinal slots enabling adjustment of the armrest height above the bar and the adjustment of the armrest forwardly of the bracket. With this system, the operator can first adjust the position of the joystick along X,Y,Z axes to suit his arm and hand with respect to the joystick and then adjust the position of the armrest accordingly. The assembly can resist heavy shocks without becoming maladjusted, and is therefore particularly suited for forest machinery.

12 Claims, 7 Drawing Sheets

ERGONOMIC ARMREST AND JOYSTICK ASSEMBLY

FIELD OF THE INVENTION

The present invention relates to an ergonomic armrest and joystick support for operators of heavy machinery.

BACKGROUND OF THE INVENTION

It is well known that many operators of heavy machinery such as forestry machines suffer from neck, shoulder and back pains. This is mainly due to the operator being obliged to keep his arms raised above the machine'armrests while operating the machine in order to effect long lever strokes or activate awkwardly placed manually-operable controls which require the operator to lift and possibly maintain his arms above the armrests. Short joysticks or other types of manual controls used to control the various machine movements together with a support for the manual controls and for an associated armrest have been in use for sometime, but these known assemblies are difficult to adjust in the right position to suit a specific operator and often come out of adjustment when subjected to heavy shocks such as when the machine travels in roadless rough terrain, e.g. in a forest.

OBJECTS OF THE PRESENT INVENTION

It is therefore the main object of the present invention to provide an ergonomic armrest and manual controls support which obviates the above noted disadvantages in that it enables the operator to first adjust the position of his manual controls in space along X,Y,Z axes with respect to his seat and backrest so that his hand and arm are in a comfortable position with respect to the manual controls, and then to adjust the position of the armrest while the operator'hand is in position over the manual controls.

Another object of the present invention is to provide a support of the kind described, which is relatively simple and inexpensive but yet of sturdy construction being capable of resisting heavy shocks without becoming maladjusted.

SUMMARY OF THE INVENTION

The assembly of the present invention comprises a bracket to be secured to a stationary member at the back and on the side of an operator'seat and above said seat, a generally horizontally disposed bar forwardly extending from said bracket and having a rear and a front end, a first connector assembly connecting the rear end of said bar to said bracket, a manual controls support located forwardly of said front end, a second connector assembly connecting said manual controls support to the front end of said bar, said first and second connector assemblies capable of adjustably positioning said manual controls support relative to said bracket along X,Y,Z axes, an armrest located above said bar intermediate its front and rear ends and a third connector assembly connecting the underside of said armrest to said bar and capable of adjustably positioning said armrest above said bar to a selected height and inclination and to a selected distance from said bracket.

Preferably, the manual controls support is further stabilized by a post secured to the front of the seat and upstanding from one side thereof. Preferably, the post is made of at least two telescopic sections and a lock releasably locks said two telescopic sections in adjusted telescoped position.

Preferably, said post releasably supports said manual controls support in its adjusted position, said first connector assembly releasably allowing upward pivoting of said bar of said manual controls support and of said armrest in out of the way position to permit the operator'ingress to or egress from the side of said seat.

Preferably, said bar has a uniform non circular cross-sectional shape along its length and said third connector assembly includes a sleeve slidably surrounding said bar but not rotatable around the same, and a knob operated locking bolt carried by said sleeve to releasably engage said bar and lock said sleeve at an adjusted position along said bar.

Preferably, the first connector assembly includes a link having one end pivoted to said bracket about a generally horizontal axis, a second sleeve slidably but not rotatably receiving said rear end of said bar, a first universal joint connecting said second sleeve to the other end of said link and manually operated locks carried by said bracket and by said second sleeve to lock the rear end of said bar in adjusted height and distance relative to and forwardly of said bracket.

Preferably, said second connector assembly includes a second universal joint and manually operated locks to lock said manual controls support in a selected inclination longitudinally and transversely of said bar.

Preferably, said third connector assembly includes a pair of longitudinally slotted elongated plates secured to and depending from the underside of said armrest and straddling opposite sides of said sleeve, a block secured to said sleeve and disposed between and in register with said elongated plates, a knob, and a bolt extending through said block and through said plate slots and screwed into said knob for pressing said elongated plates against said sleeve on opposite sides thereof and lock said armrest into a selected height and inclination.

BRIEF DESCRIPTION OF THE DRAWINGS

In the annexed drawings, like reference numerals indicate like elements throughout.

DETAILED DESCRIPTION OF THE PREFERRED EMBODIMENT

Figure 1:
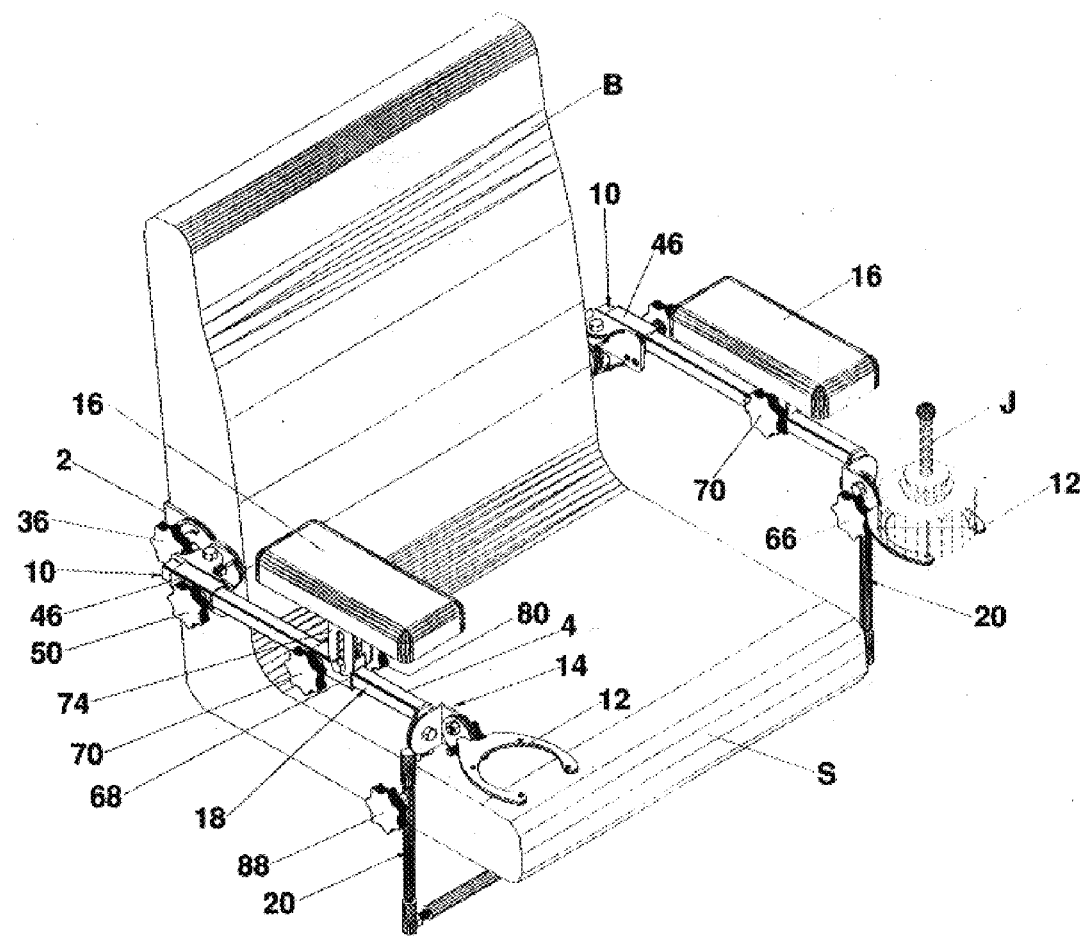
FIG. 1 is a perspective view of a chair to be used by an operator of heavy machinery and fitted with two assemblies in accordance with the present invention, one on each side of the chair.
Figure 2:
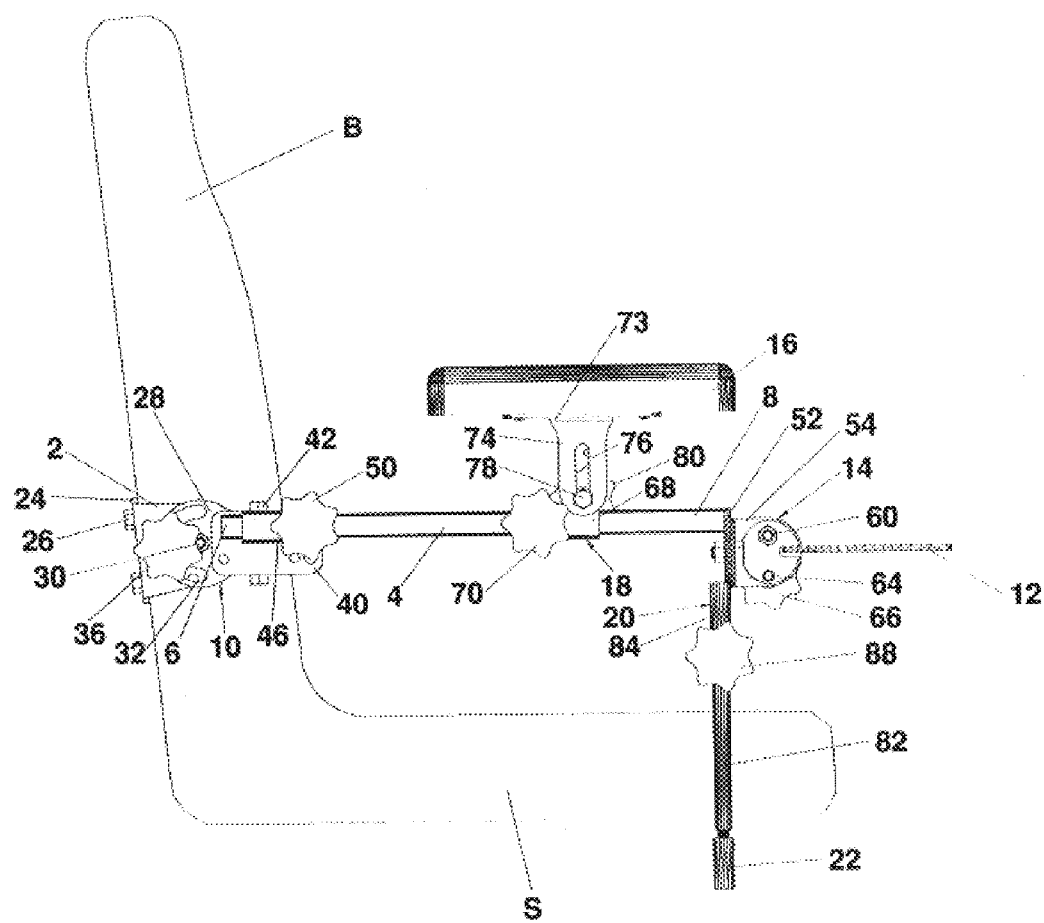
FIG. 2 is a side elevation of the chair and one armrest assembly.
Figure 3:
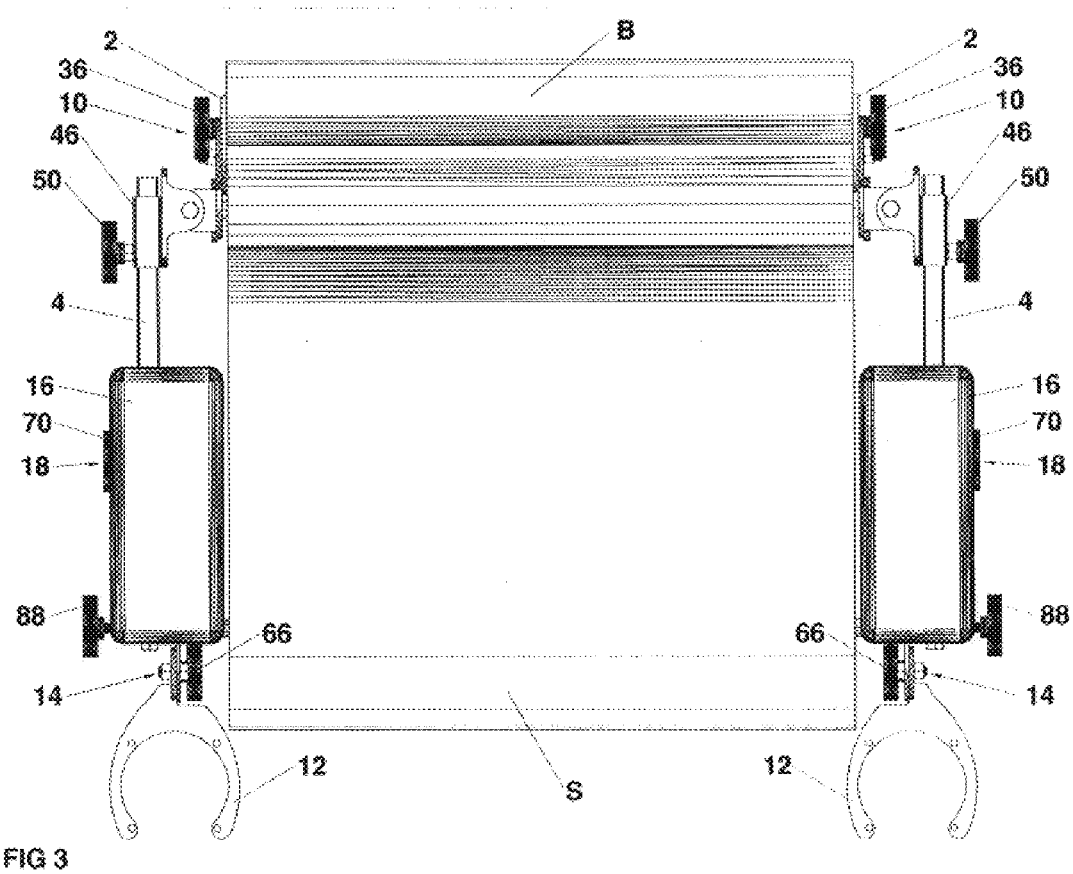
FIG. 3 is a top plan view of the chair of FIG. 1.
Figure 4:
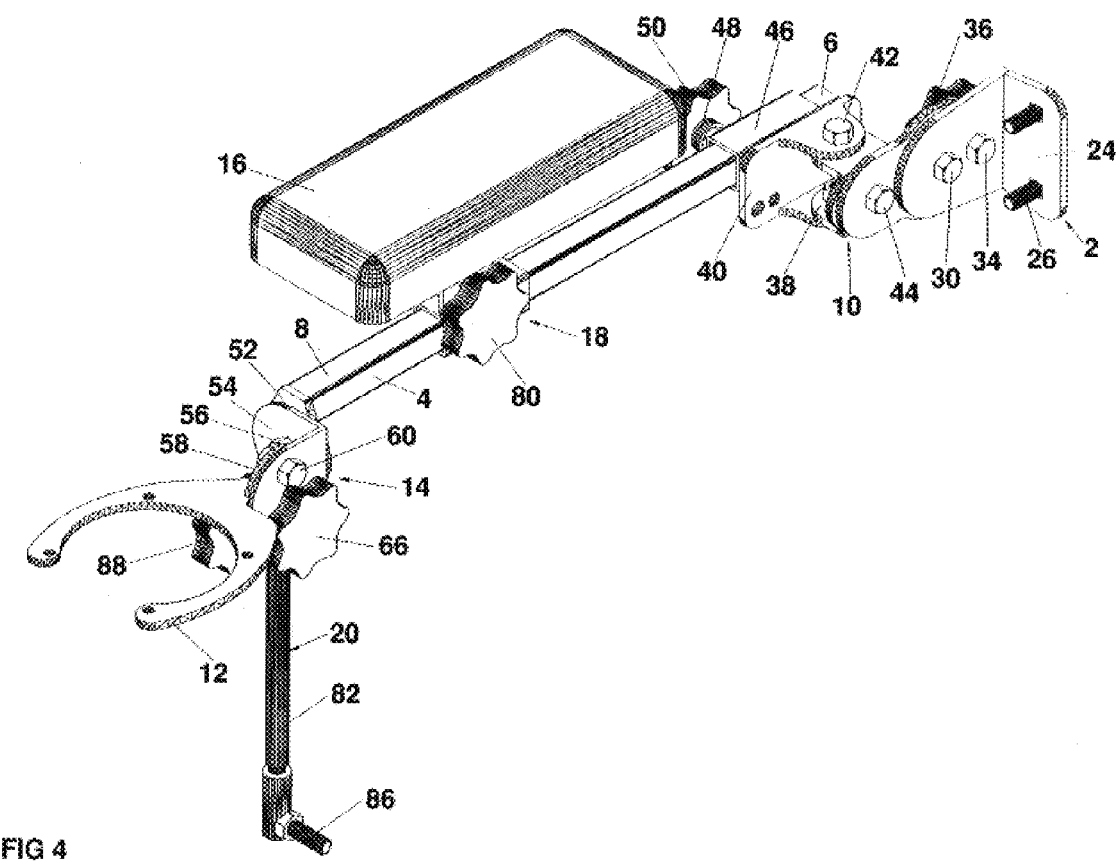
FIGS. 4 and 5 are perspective views taken from different angles of one armrest and joystick support assembly in accordance with the present invention.

The operator of a heavy machinery such as forestry machinery is seated in a seat S fitted with a backrest B so as to operate joysticks J with each of his hands. Joysticks J can be replaced by any suitable manual controls, such as levers, push buttons and the like to operate the various movements of the machinery components.

There is an assembly in accordance with the invention mounted on each side of the seat S an backrest B. Each assembly includes a bracket 2 to be secured to the back of the backrest B or to an adjacent part of the cabin structure in which the seat is located. The assembly further includes a straight bar 4 of uniform non circular cross-section preferably of square cross-section. The bar 4 has a rear end 6 and a front end 8. Rear end 6 is connected to the bracket 2 by a first connector assembly 10.

Figure 6:
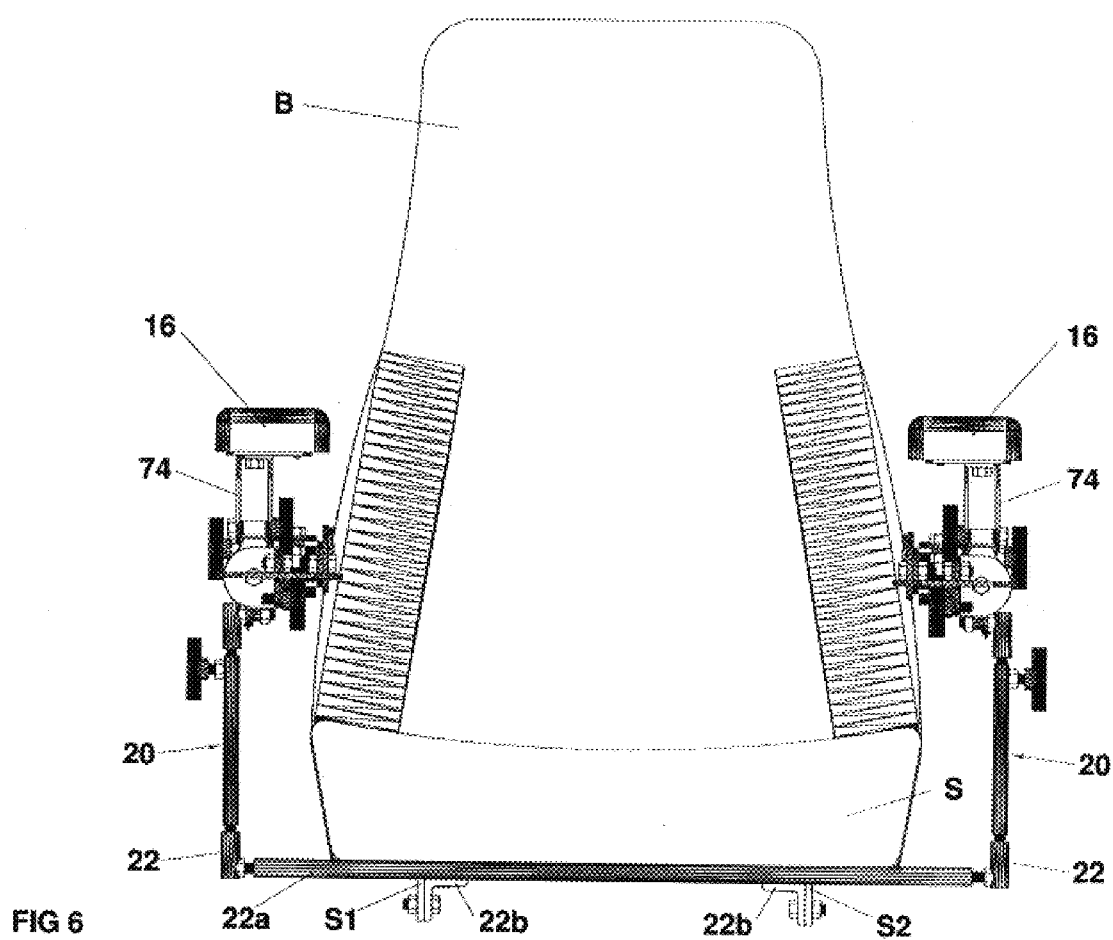
FIG. 6 is a front elevation of the chair flanked by the two armrest assemblies, and further showing the attachment of the armrest support structure to the chair underside.
Figure 7:
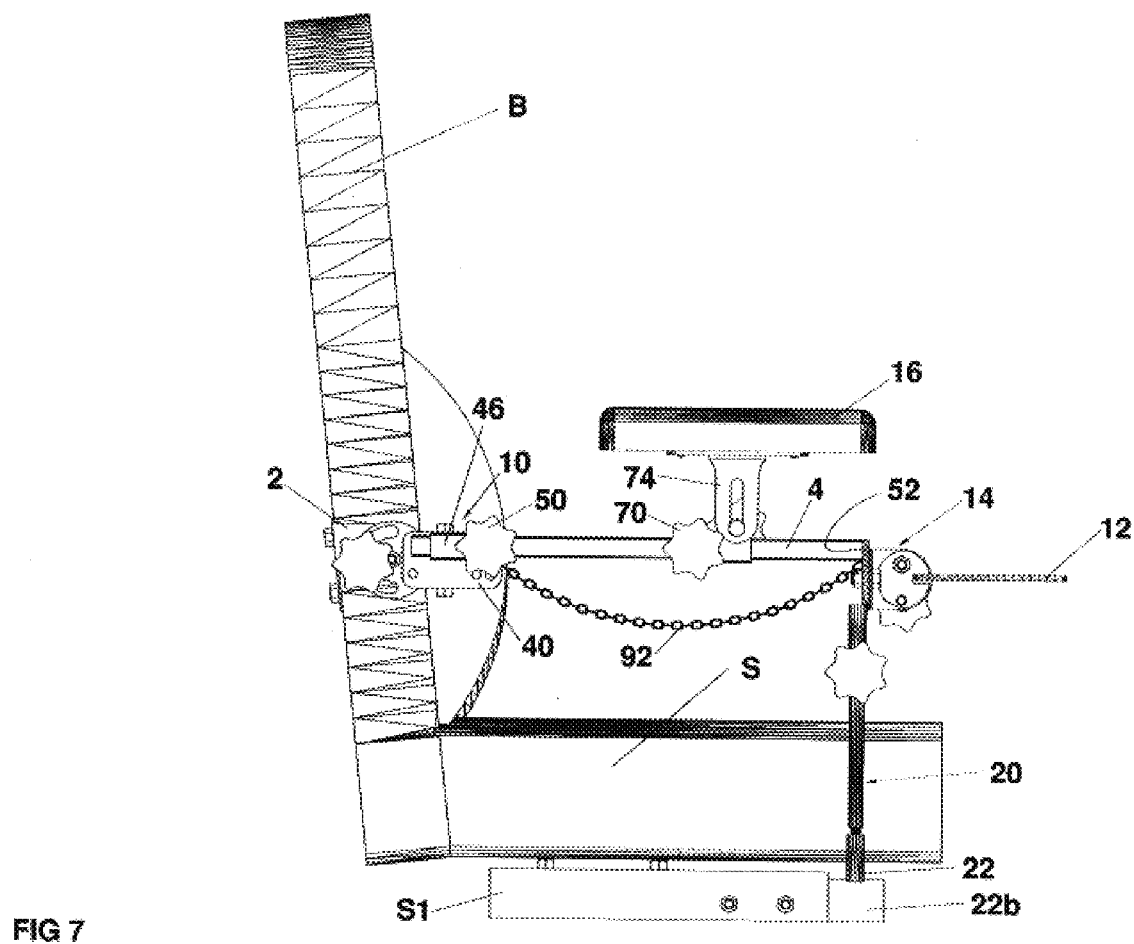
FIG. 7 is a side elevation of the chair with one armrest assembly, showing the attachment of the armrest support structure to the chair underside and further showing a security chain linking the relatively movable front and rear portions of the armrest assembly.

A joystick or manual controls support 12 is connected to the front end 8 of bar 4 by a second connector assembly 14. An armrest 16, located above an intermediate portion of bar 4 is connected to the latter by a third connector assembly 18. Front end 8 of bar 4 is firmly supported by a post 20 which is secured to a bracket 22 fixed to the underside of the seat S at the front of the same. As shown in FIGS. 6 and 7, brackets 22, 22 are attached to the opposite end portions of a transverse support rod 22a which transversely extends along the seat S underside. Support rod 22a is in turn carried by tie plates 22b, 22b mounted on the seat S support tracks $S_1$, $S_2$.

Bracket 2 has a back flange 24 secured by bolts 26 to the back of backrest B or to the cabin structure as defined above. The bracket 2 is therefore disposed above the seat S and at the level of the backrest. A flat stock link 28 is pivoted on a horizontal pivot bolt 30 secured to bracket 2. Link 28 has a concentric slot 32 through which a tightening bolt 34 extends fitted with a manually operated knob screw 36.

Therefore, the vertical inclination of link 28 can be firmly adjusted by screwing knob 36. A first universal joint is mounted at the forward end of link 28, this joint consists of two U-shaped members 38, 40 with overlapping horizontal flanges interconnected by a vertical pivot bolts 42 and with the web of member 38 pivoted to the outer end of link 28 by a horizontal pivot bolt 44. A sleeve 46 is secured to the U-shaped member 40 in which the rear end 6 of bar 4 is slidably and non rotatably inserted. A tightening bolt 48 is screwed within sleeve 46 and is operated by a knob 50 to tighten the bar 4 in a longitudinally adjusted position within sleeve 46.

The second connector assembly 14 simply consists of an end plate 52 welded or otherwise secured to the front end 8 of bar 4 and an L-shaped plate 54 is pivoted against end plate 52 by means of a bolt and nut assembly 56.

Manual controls support 12 is a flat, generally horizontal, U-shaped plate disposed for supporting the joystick J or other set of manual controls and has a rearwardly extending vertical ear 58 which is pivoted by bolt and nut 60 to the forwardly extending flange of L-shaped plate 54. This flange has a slot (not shown) concentric with bolt 60 through which a tightening bolt 64 extends, being operated by a knob 66.

Third connector assembly 18 includes an armrest supporting sleeve 68 which is slidably mounted around the non circular bar 4, and can be adjustably locked to the same by a knob operated sleeve engaging bolt 70.

A block 72 is secured on top of sleeve 68 and a U-shaped member providing a web 73 and a pair of parallel elongated legs 74, serves to support armrest 16 in adjusted position on bar 4. Legs 74 have transversely registering longitudinal slots 76 and straddle block 72 and the sides of sleeve 68. A bolt 78 extends across the registering slots 76 and is screwed into a knob operated nut 80. Operation of knob 80 serves to tighten the two elongated plates 74 against the sides of block 72 and of sleeve 68 to thereby adjust armrest 16 both angularly and longitudinally of bar 4. Furthermore, armrest 16 is pivotally mounted by a vertical pivot on top of the web 73 for free rotation thereon so that the orientation of the armrest transversely of bar 4 can be changed to suit the operator'desire.

Figure 5:
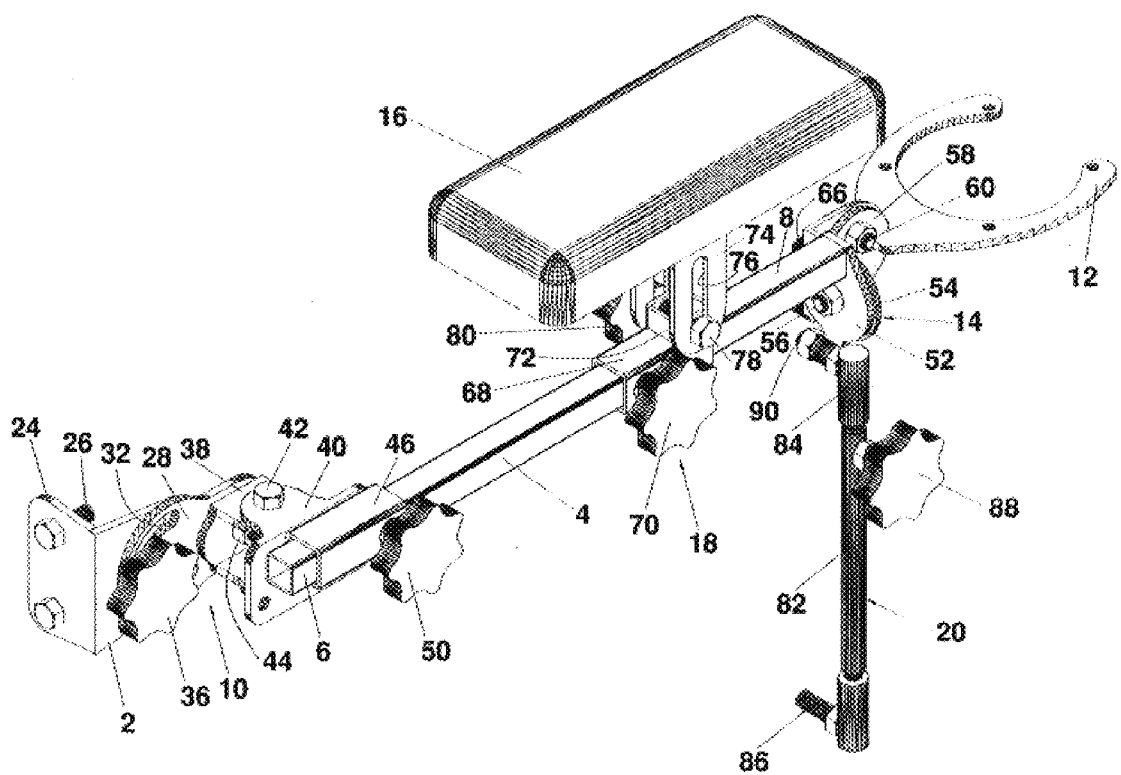

Post 20 consists of a two telescopic section namely lower post section 82 and upper post section 84 Lower post section 82 is secured on top of a transverse horizontal rod 86 which supports the post of the two assemblies on each side of the seat. This transverse rod 86 is fixed under the seat. The total length of the two telescopic post sections 82, 84 can be adjusted by a knob-operated screw 88 extending through the lower section 82 and tightened against upper telescopic section 84. The latter is attached to end plate 52 by means of a horizontal pivot 90, see FIG. 5, which is transverse to the post sections 82, 84. Therefore, horizontal bar 4 is no longer held in cantilevered position but is firmly supported at its front end by the post 20. Adjustment of the two post sections 82, 84 by means of the knob 88 will firmly adjust the vertical position of the manual controls support 12, relative to seat S.

When the machinery operator wants to enter or leave seat S from the side, the two knobs 88 and 36 are simply loosened and bar 4 is raised about horizontal pivot 30 allowing separation of the two telescopic post sections 82,84. In operative position, rigid bar 4 directly connects the support plate 12 to the bracket 2 and is firmly supported by the front post 20. Therefore, the device forms a strong support for both the manual controls such as joystick J and the armrest 16 and will resist any shocks normally caused by heavy mobile machineries such as forestry machinery travelling in rough terrain in a forest.

FIG. 7 shows that a security chain 92 can be provided on the assembly according to the invention, to link the relatively movable front and rear portions thereof. More particularly, the rear end portion of chain 92 is attached to sleeve 46, and the front end portion of chain 92 is attached to the end plate 52. In an operative position of the assembly, as shown in FIG. 7, the intermediate portion of chain 92 loosely hangs under elongated bar 4. The purpose of chain 92 is to prevent bar 4 from accidentally falling off from sleeve 46, especially while the forestry machine is moving. Indeed, loosening knob 50 to adjust the position of the armrest 16 and of the joystick support 12 by sliding bar 4 in sleeve 46, can allow accidental disengagement of bar 4 from sleeve 46. This can become dangerous if, for example, a vehicle equipped with the assembly according to the invention is moving while the operator accomplishes this last described adjustment, and the bar 4 falls off from its sleeve 46, then the joystick J supported by support 12 be pivoted under the fall into an undesirable position, consequently transmitting undesirable commands to the machinery. Chain 92, or any other suitable stopper member, prevent this from happening.

I claim:

1. An ergonomic armrest and controls support assembly for heavy machinery operators comprising a bracket which is secured to a side of a backrest at a position above a seat, a generally horizontally disposed bar forwardly extending from said bracket and having a rear and a front end, a first connector assembly consisting of a first and a second U-shaped member each having a web, these U-shaped members having overlapping horizontal flanges interconnected by a vertical pivot bolt and with said web of said first U-shaped member being pivoted to an outer end of a link by a first horizontal pivot bolt, said link being itself pivoted on a second horizontal pivot bolt secured to said bracket, a sleeve being secured to said second U-shaped member in which said rear end of said bar is slidably and non rotatably inserted, said first connector assembly connecting the rear end of said bar to said bracket, a manual controls support located forwardly of said front end, a second connector assembly consisting of an end plate, secured to said front end of said bar, and an L-shaped plate, pivoted against said end plate by means of a bolt and nut assembly, said second connector assembly connecting said manual controls support to the front end of said bar, said first and second connector assemblies capable of adjustably positioning said support relative to said bracket along a first axis X coaxial to said bar, a second axis Y coaxial to said second horizontal pivot bolt, and a third axis 7 coaxial to said vertical pivot bolt, an armrest located above said bar intermediate its front and rear ends and a third connector assembly connecting the underside of said armrest to said bar and capable of adjustably positioning said armrest above said bar to a selected height and inclination and to a selected distance from said bracket.

2. An ergonomic armrest and controls support assembly as defined in claim 1, further including a post secured to the front of said seat, upstanding from a side thereof and directly supporting said manual controls support in its adjusted position.

3. An ergonomic armrest and controls support assembly as defined in claim 2, wherein said post is made of at least two telescopic sections and further including a lock to releasably lock said two telescopic sections in adjusted telescoped position.

4. An ergonomic armrest and controls support assembly as defined in claim 3, wherein said post releasably supports said manual controls support in its adjusted position, said first connector assembly releasably allowing upward pivoting of said bar of said manual controls support and of said armrest in out of the way position to permit the operator's ingress to or egress from the side of said seat.

5. An ergonomic armrest controls support assembly as defined in claim 1, wherein said bar has a uniform non circular cross-sectional shape along its length and said third connector assembly includes a sleeve slidably surrounding said bar but not rotatable around the same, and a knob operated locking bolt carried by said sleeve to releasably engage said bar and lock said sleeve at an adjusted position along said bar.

6. An ergonomic armrest and controls support assembly as defined in claim 5, wherein said third connector assembly includes a pair of longitudinally slotted elongated plates secured to and depending from the underside of said armrest and straddling opposite sides of said sleeve, a block secured to said sleeve and disposed between and in register with said elongated plates, a knob, and a bolt extending through said block and through said plate slots and screwed into said knob for pressing said elongated plates against said sleeve on opposite sides thereof and lock said armrest into a selected height and inclination.

7. An ergonomic armrest and control support assembly as defined in claim 6, wherein said plates are interconnected by a top web and wherein said armrest is mounted for adjustable rotation about a generally vertical axis on top of said web.

8. An ergonomic armrest and controls support assembly as defined in claim 5, wherein said first connector assembly includes a link having one end pivoted to said bracket about a generally horizontal axis, a second sleeve slidably but not rotatably receiving said rear end of said bar, a first universal joint connecting said second sleeve to the other end of said link and manually operated locks carried by said bracket and by said second sleeve to lock the rear end of said bar in adjusted height and distance relative to and forwardly of said bracket.

9. An ergonomic armrest and controls support assembly as defined in claim 8, wherein said second connector assembly includes manually operated locks to lock said manual controls support in a selected inclination transversely of said bar.

10. An ergonomic armrest and controls support assembly as defined in claim 9, wherein said third connector assembly includes a pair of longitudinally slotted elongated plates secured to and depending from the underside of said armrest and straddling opposite sides of said sleeve, a block secured to said sleeve and disposed between and in register with said elongated plates, a knob, and a bolt extending through said block and through said plate slots and screwed into said knob for pressing said elongated plates against said sleeve on opposite sides thereof and lock said armrest into a selected height and inclination.

11. An ergonomic armrest and controls support assembly as defined in claim 10, further including a post secured to the front of said seat, upstanding from a side thereof and directly supporting said joystick support in its adjusted position, said post being made of at least two telescopic sections and further including a lock to releasably lock said two telescopic sections in adjusted telescoped position and wherein said post releasably supports said manual controls support in its adjusted position, said first connector assembly releasably allowing upward pivoting of said bar, of said manual controls support and of said armrest in out of the way position to permit the operator'ingress to or egress from the side of said seat.

12. An ergonomic armrest and controls support assembly as defined in claim 5, wherein said second connector assembly includes manually operated locks to lock said manual controls support in a selected inclination transversely of said bar.

* * * * *